Patented May 3, 1938

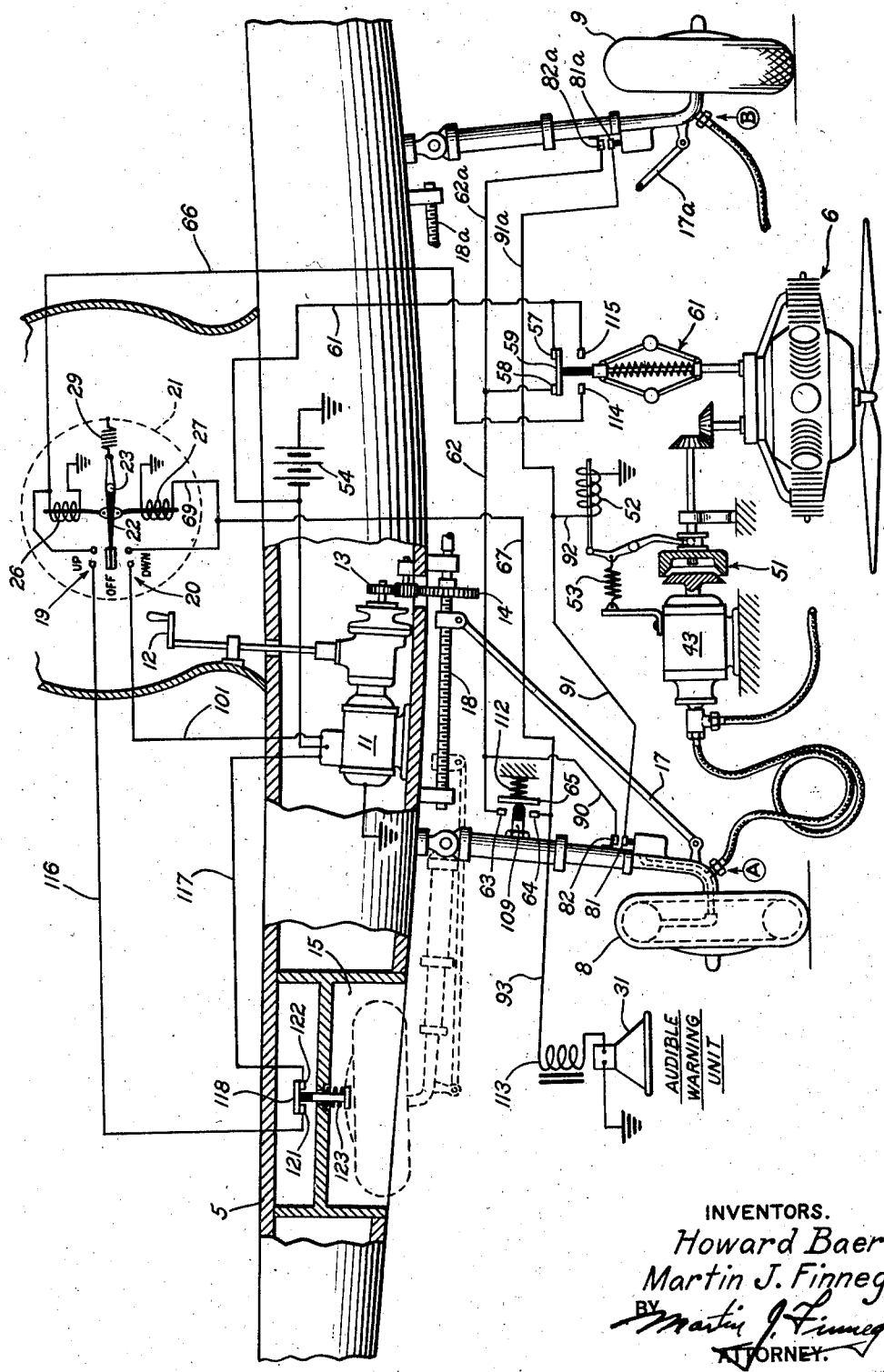

2,115,701

UNITED STATES PATENT OFFICE 2,115,701

AIRCRAFT CONTROL

Howard Baer, Jersey City, N. J., and Martin J. Finnegan, New York, N. Y., assignors to Eclipse Aviation Corporation, East Orange, N. J., a corporation of New Jersey Application May 1, 1937, Serial No. 140,244

7 Claims. (Cl. 244—102)

This invention relates to aircraft, and particularly to the under-carriage, or landing gear, of aircraft.

An object of the invention is to provide automatic control of the positioning of the craft's landing gear.

A second object is to provide automatic control of the degree of inflation of the tires of the landing gear.

Other objects are to provide, in a motor operated landing gear system, automatic control of the energization of the landing gear motor, as well as of the duration of such energization; to provide automatic indications, of the landing gear's position, together with an inter-connecting of the indications and controls with the speed of the aircraft propeller drive, whereby a reduction in speed causes the energization of the landing gear motor and the sounding of an alarm to indicate a lack of completeness of the gear extending operation.

These and other objects of the invention will become apparent from inspection of the following specification when read with reference to the accompanying drawing wherein is illustrated the preferred embodiment of the invention. It is to be expressely understood, however, that the drawing is for the purpose of illustration only, and is not designed as a definition of the limits of the invention, reference being had to the appended claims for this purpose.

In the drawing:—

Reference character 5 designates an aircraft having a motor 6 which either singly or in conjunction with additional motors and associated propellers constitute the flight sustaining means for the craft. Reference characters 8 and 9 designate the two type of wheels constituting the ground contacting portion of the landing gear, and reference character 11 designates an electric motor which in conjunction with manually operable means 12 and a gear train indicated, in part, at 13 and 14, constitute the means for raising the landing gear to the retracted position whereby in the wheels enter recesses or wells in the body of the craft corresponding to the recess for the wheel 8 which is indicated at 15, said electric motor being of a reversible type such as that indicated in Figs. 2 and 3 in the application of Joseph W. Allen, Serial No. 50,229, filed November 16, 1935, whereby the said motor is effective not only as a gear retracting means but also as a gear extending means; the different operations being made possible by the reversibility of the motor under the control of the two directional energizing switches 19 and 20 which are preferably located within the indicating device 21 so that movement of the rotatable element or index 22 of the said device or of some other part associated therewith, on the same rockshaft 23, will cause closure of one or the other of the said directional switches, depending upon which of the two actuating solenoids 26 and 27 is energized, the said switch element being normally held in the lateral position indicated by suitable means which is shown in the form of a centering spring 29 suitably mounted in the housing 21.

As above indicated the invention involves the inter-connecting of engine speed responsive means with the landing gear operating and position indicating means, whereby a reduction in the speed of the propelling engine of the craft—such as that which necessarily takes place before the craft can be successfully maneuvered to a landing—produces an automatic energization of the solenoid 27, which energization in turn produces first, a movement of the index element 22 to the "down" position to indicate that the landing gear extending mechanism is coming into operation to move the gear to its lower position; secondly, to cause energization of the landing gear motor 11 to produce such lowering of the landing gear; and thirdly, to cause energization and operation of the audible warning unit 31 the purpose of which is to inform the operator that the lowering of the landing gear has not been completed, the actual completion of such lowering operation being assured only when certain automatic control means, to be described, have functioned to produce a discontinuance of the audible signal emitted by the warning unit; and fourthly, an energization of the compressor 43, which, in conjunction with certain control elements to be described, provides an automatic regulation of the degree of inflation—that is, of the air pressure within the inflatable tubes of the tires of the landing wheels 8 and 9, the compressor 43 being connected with said tubes through suitable air hose and coupling valves, as indicated at (A) and (B).

As shown the energization of the compressor is brought about by electromagnetic means operating to drivably connect the engine with the said compressor by way of a normally disengaged clutch mechanism 51 the engagement of which is controlled by the solenoid 52 which like the solenoids 26 and 27, the warning unit 31 and the landing gear motor 11, derive their energy preferably from a common source indicated diagrammatically at 54.

The means for producing energization of the solenoid 27 includes as shown, a circuit from the source 54 which may carry current to the said solenoid by way of electrical connections which include the contacts 57 and 58 adapted to be bridged by a current conducting bridge element 59 carried by the centrifugal governor mechanism 61 and movable by said mechanism into the circuit closing position whenever the speed of the engine 6 falls to a degree corresponding to the throttle or landing speed of the craft. When this occurs current passes to the solenoid 27 by way of conductor 61 and said switch elements 57, 58 and 59, a second conductor 62, a pair of contacts 63 and 64 which under the circumstances will be bridged by the member 65 (the landing gear being still in the retracted position), and additional conductors 67 and 69, the latter leading directly to the said solenoid 27 from which the current passes to ground as indicated. At the same time a circuit in shunt with the circuit just traced may or may not be established for the purpose of energizing the compressor controlling solenoid 52, the establishment of this second circuit depending upon the the amount of pressure remaining within the tires of the wheels 8 and 9. This pressure control of the circuit includes a pair of pressure operated movable contacts 81 and 81a adapted to engage associated contacts 82 and 82a respectively, by a spring action corresponding to that of any of the well-known pressure operated switch mechanisms such as that shown in Patent 2,063,871 granted December 8, 1936 to Morgan C. French, either spring being effective to close the circuit to solenoid 52 whenever the pressure within either tire falls below a predetermined value, as would be the case if, for example, one of the tires had theretofore been punctured in rolling along the ground surface prior to the beginning of the craft's flight. As shown, this circuit includes, in addition to the above described switch 59, one or the other of a pair of conductors 62 and 62a, the former leading to switch 82, 81 through conductor 90 and hence adapted to carry current whenever the switches 59 and 82, 81 are simultaneously in the closed position, and the conductor 62a being shown as leading to the switch 82a, 81a, and each switch being connected (by way of 91 or 91a) to a common lead 92 connecting to the solenoid 52 and ground. A third branch circuit leads to the audible warning unit 31 which is shown as of the electromagnetic type, the winding of its electromagnet 113 being energizable by a conductor 93 tapped from the conductor 67 and hence insuring energization of the said warning unit during the same period as that of the solenoid 27.

Energization of the solenoid 27 causes the index element 22 to move to the "down" position and closes a circuit to the landing gear motor 11 by way of the shunt connection 101 and the contacts of the switch 20 which are closed by such movement of the index element. The resulting rotation of the motor and the gear train associated therewith produces a movement of the landing gear operating members 17 and 17a along the lead screw 18 and 18a, whereupon the wheels are brought to their lowermost position for contact with the ground as the flight is terminated—the process of inflating the tires proceeding during this lowering operation by virtue of the energization of the clutch operating solenoid if such inflation is necessary as determined by the closure of the switches 81, 82 and/or 81a, 82a.

As soon as the wheels have reached the lowermost position the striker element 109 engages the switch bridging member 65 to move the latter to the open position against the closing tendency of the spring 112 and thereby discontinue the energization of both the solenoid 27 and the solenoid 113, the de-energization of the former permitting the opening of the motor circuit and the return of the index element 22 to the neutral or "off" position, while the de-energization of the latter causes the silencing of the warning unit, which silencing is the pilot's assurance that the landing gear is in the safe extended position for a proper landing. Meanwhile the reflation of the tires will produce a reopening of the pressure operating switches 81, 82 and/or 81a, 82a and a resulting de-energization of the clutch, disengaging the compressor 43, whereupon the spring 53 will become effective to release the clutch and thereby bring the compressor to a stop. The parts will thereafter remain in the neutral positions indicated until the craft is prepared for its next flight whereupon the restarting of the engine 6 and the acceleration thereof to full climbing speed will draw the switch element 59 from the position indicated to the lower position in which it bridges the contacts 114 and 115 and thereby closes a circuit to the upper solenoid 26 of the indicator device, the circuit being by way of the said switch 114 and 115, the conductors 61 and 66 and the said solenoid 26 to ground. Energization of the said solenoid causes first the movement of the indicator pointer to the "up" position to close contacts of switch 19 and simultaneously therewith energization of the landing gear motor to cause its rotation in a direction opposite to that previously described, the circuit to the motor passing through the branch connections 116 and 117 which are now connected through the bridge element 118 and the switch contacts 121 and 122, the former being normally held closed by the spring 123 until such time as the resulting rotation of the motor operated gear train has served to draw the wheels to the retracted positions, in which positions the said switch is moved to the open position by contact of the wheel therewith and the resulting compression of the spring 123. This action de-energizes the motor, but the circuit to the upper solenoid 26 remains closed during the ensuing normal flight of the craft, as such normal flight necessitates maintenance of a speed sufficient to insure continued engagement of the centrifugal governor operated bridging member 59 with the contact 114 and contact 115 which control energization of the said upper solenoid. Thus the indicator pointer will continue to show the fact that the landing gear is in the retracted position until such time as the entire cycle of operations is repeated by the action of slowing down the plane preparatory to termination of the flight.

What is claimed is:—

1. In an aircraft, in combination with a shiftable landing gear, including inflatable tires, a gear shifting motor, a compressor, electrical means controlling energization of said motor and compressor, said electrical means including a source of current, and conductors from said source to said motor and compressor, said conductors including an engine speed responsive switch and a second switch in series therewith, said second switch being operable by the pressure of the fluid pumped into said tires by said compressor.

2. In an aircraft, in combination with a shiftable landing gear, including inflatable tires, a gear shifting motor, a compressor, electrical means controlling energization of said motor and compressor, said electrical means including a source of current, and conductors from said source to said motor and compressor, said conductors including an engine speed responsive switch and a second switch in series therewith, said second switch being operable by the pressure of the fluid pumped into said tires by said compressor, a third switch also in series with said speed responsive switch, and means movable with said third switch to indicate the "up" or "down" extreme position of said landing gear.

3. In an aircraft, in combination with a shiftable landing gear, including inflatable tires, a gear shifting motor, means including a compressor for maintaining said tires inflated, means for energizing said motor, and means operable simultaneously with the energization of said motor to cause energization of said compressor.

4. In an aircraft, in combination with a shiftable landing gear, including inflatable tires, a gear shifting motor, a compressor, electrical means controlling energization of said motor and compressor, said electrical means including a source of current and conductors from said source to said motor and compressor, said conductors including an engine speed responsive switch and a second switch in series therewith, said second switch being operable by the pressure of the fluid pumped into said tires by said compressor, a third switch also in series with said speed responsive switch, means movable with said third switch to indicate the "up" or "down" extreme positions of said landing gear, additional means for indicating that the landing gear is in a position intermediate said extreme positions, and a fourth switch in series with said speed responsive switch to control energization of both said indicating means.

5. In an aircraft, in combination with a shiftable landing gear, a gear shifting motor, electrical means controlling energization of said motor, said electrical means including a source of current and conductors from said source to said motor, said conductors including an engine speed responsive switch and a second switch in series therewith, means movable with said second switch to indicate the "up" and "down" extreme positions of said landing gear, additional means for indicating that the landing gear is in a position intermediate said extreme positions, and a third switch in series with said speed responsive switch to control energization of both said indicating means, said third switch being operable by movement of said landing gear.

6. In an aircraft, in combination with a shiftable landing gear, a gear shifting motor, electrical means controlling energization of said motor, said electrical means including a source of current and conductors from said source to said motor, said conductors including an engine speed responsive switch and a second switch in series therewith, means movable with said second switch to indicate the "up" and "down" extreme positions of said landing gear, and additional means for indicating that the landing gear is in a position intermediate said extreme positions.

7. In an aircraft, in combination with a shiftable landing gear, a gear shifting motor, electrical means controlling energization of said motor, said electrical means including a source of current and conductors from said source to said motor, said conductors including two pairs of contacts, each pair being normally unbridged, a pair of electromagnets having a common armature disposed therebetween, a pair of conducting plates, each insulated from the other mounted on said armature, means for energizing one of said electromagnets to draw said armature toward it and thereby cause one of said conducting plates to bridge one pair of said contacts, to energize said motor for clockwise rotation, means for energizing the other of said electromagnets to draw said armature toward it and thereby cause the other of said conducting plates to bridge the second pair of said contacts, to energize said motor for counter-clockwise rotation, means operating to hold said armature midway between said electromagnets when the latter are de-energized, and a dial surface associated with said armature to give a visible indication of the position and movements of said armature, in terms of the landing gear.

HOWARD BAER.
MARTIN J. FINNEGAN.